United States Patent [19]
Jimenez

[11] 3,722,400
[45] Mar. 27, 1973

[54] TACO SHELL FRYER

[76] Inventor: James A. Jimenez, 6252 North Hart, Temple City, Calif. 91780

[22] Filed: July 16, 1970

[21] Appl. No.: 55,486

[52] U.S. Cl. ..........................99/353, 99/355, 99/404, 99/407, 99/427
[51] Int. Cl. ....................................A47j 37/12
[58] Field of Search ....107/57, 58; 99/353, 355, 404, 99/407, 427, 443 C

[56] References Cited

UNITED STATES PATENTS

| | | | |
|---|---|---|---|
| 3,570,393 | 3/1971 | Schy | 99/404 |
| 2,557,467 | 6/1951 | Rodriquez | 99/410 |
| 2,603,143 | 7/1952 | Saenz | 99/404 X |
| 2,967,474 | 1/1961 | Ford | 99/404 |
| 2,907,268 | 10/1959 | Doolin | 99/427 X |
| 3,520,248 | 7/1970 | MacKendrick | 99/404 X |
| 3,267,836 | 8/1966 | Yepis | 99/404 |
| 3,576,647 | 4/1971 | Liepa | 99/404 X |
| 3,602,130 | 8/1971 | Perez | 99/404 |

Primary Examiner—Billy J. Wilhite
Attorney—Whann & McManigal

[57] ABSTRACT

An apparatus for preparing taco shells from uncooked tortillas comprising a cooking vessel for containing cooking oil, a plurality of expandable taco shell forming means for holding the tortillas during cooking, spaced guide members disposed within the cooking vessel and arranged so as to frictionally engage the taco shell forming means, a conveyor for moving taco shell forming means between the spaced guide members and means cooperating with the taco shell forming means to free the cooked taco shell therefrom.

13 Claims, 14 Drawing Figures

JAMES A. JIMENEZ
INVENTOR
WHANN & McMANIGAL
Attorneys for Applicant
BY

TACO SHELL FRYER

BACKGROUND OF THE INVENTION

1. Field of the invention

This invention relates to a food cooking apparatus and more particularly to an apparatus for preparing a V-shaped Mexican food product known as a taco shell.

2. Description of the prior art

Prior to this invention various types of apparatus for preparing taco shells have been developed. A basic problem inherent in these devices has been their inability to automatically produce large quantities of taco shells of uniform high quality. The fragile nature of the uncooked tortilla from which the taco shell is formed requires that during the pickup, forming, cooking and discharge cycles of automatic processing, the tortilla be carefully protected from pressural loads which tend to tear or otherwise damage it. Prior devices have not been entirely successful in designing mechanisms which provide adequate protection to the tortilla. In addition, in order to produce taco shells of uniform texture and consistency, it is necessary that during the cooking cycle there be a relatively free flow of the cooking oil over the surfaces of the tortilla. It is important, therefore, to provide a mechanism which will not only support, protect and properly form the tortilla during cooking, but one which will not clamp of encase the tortilla in such a manner that the free flow of cooking oil over its surfaces is inhibited.

A prior apparatus is a hand-operated, low-production output device having a somewhat cumbersome mechanical arrangement for forming and holding tortillas during cooking. In this device the tortilla is held captive during processing between two hinged plates and a V-shaped mold. The mold is brought into engagement with tortilla and the plates by the turning of a hand crank. Unless great care is used in positioning the tortilla on the plates and in bringing the mold into engagement with the tortilla, tearing or other damage to the tortilla can easily result. Further, since the tortilla is clamped between the inside surfaces of the hinged plates and the outside surfaces of the mold, free and uniform circulation of the cooking oil over the surfaces of the tortilla is inhibited and nonuniform cooking of the tortilla can result.

SUMMARY OF THE INVENTION

This invention involves a significantly improved type of apparatus for the automatic preparation of high quality taco shells from uncooked tortillas. The apparatus comprises a cooking vessel for containing cooking oil, a plurality of taco shell forming means for holding tortillas during processing, each having wing-like side panels yieldable relative to each other within fixed limits, spaced guide members disposed within the cooking vessel and adapted for frictional engagement with bearing strips mounted on the outer edges of the side panels of the forming means, means for moving the forming means through the preparation process and means cooperating with the forming means for freeing the cooked taco shell therefrom. The unique design of the taco shell forming means protects the tortilla from experiencing any pressural loads which could tear or otherwise damage it during the preparation process. In addition, the forming means holds the tortillas in a new and novel way such that they are uniformly exposed to the free flow of the cooking oil during the cooking cycle.

A principal object of my invention is to provide an apparatus for automatic production of large quantities of uniformly high quality taco shells from tortillas.

Another object is to provide an apparatus of the character referred to having a forming means for forming tortillas into uniformly-shaped taco shells which has yieldable sides upon which are mounted bearing means adapted to protect the tortilla from experiencing any pressural loads during processing which might tear or otherwise damage the tortilla.

Still another object of my invention is to provide an apparatus of the character referred to in the preceding paragraph in which the tortillas are carried by a yieldable forming means through a passageway between a pair of guide walls or confining walls so that the tortillas will be suitably supported and appropriately formed during the cooking cycle.

It is another object of my invention to provide a taco making apparatus of the class described in which a pair of wall means form an elongated space within which a taco forming means is moved with the tortilla supported by it, the wall means being separated a predetermined distance from each other and the taco forming means being expansible therebetween.

A further object of my invention is to provide an apparatus of the character referred to having conveyor means for automatically moving the forming means between the wall means and then through the remainder of the taco shell preparation process.

Still another object is to provide an apparatus of the class described wherein the confining means or guide means for confining the forming means during the cooking cycle comprise elements movable along the path of movement of the forming means.

It is another object of my invention to provide an apparatus of the character referred to in the preceding paragraph in which the taco forming means carrying the tortilla moves through the cooking cycle at the same speed as the moving confining means so that there is no relative movement between the forming means and the confining means.

A further object of my invention is to provide, in an apparatus of the class described, a means for centering uncooked tortilla in the path of the moving forming means so that they may be appropriately picked up by the forming means and carried into the cooking cycle.

It is another object of my invention to provide an apparatus as described in the preceding paragraph in which the tortillas to be cooked are picked up by the moving forming means and carried through an entrance means consisting of a passageway formed by a pair of spaced curved guide walls or confining walls.

It is a further object of my invention to provide an apparatus as previously described in which the taco shell forming means move through an entrance means having a plurality of rollers which are so arranged as to facilitate the movement of the forming means into the cooking cycle.

Still a further object of my invention is to provide an apparatus of the class described having means for alternately compressing the yieldable side panels of the forming means and then abruptly releasing them, so as to cause the taco shell to move forwardly from the forming means allowing it at the proper time to fall therefrom and be ejected from the apparatus for use in preparing tacos.

BRIEF DESCRIPTION OF THE DRAWINGS

It is believed the invention will be better understood from the following drawings, in which.

DESCRIPTION OF THE PREFERRED EMBODIMENT

Figures 1, 9, 10:
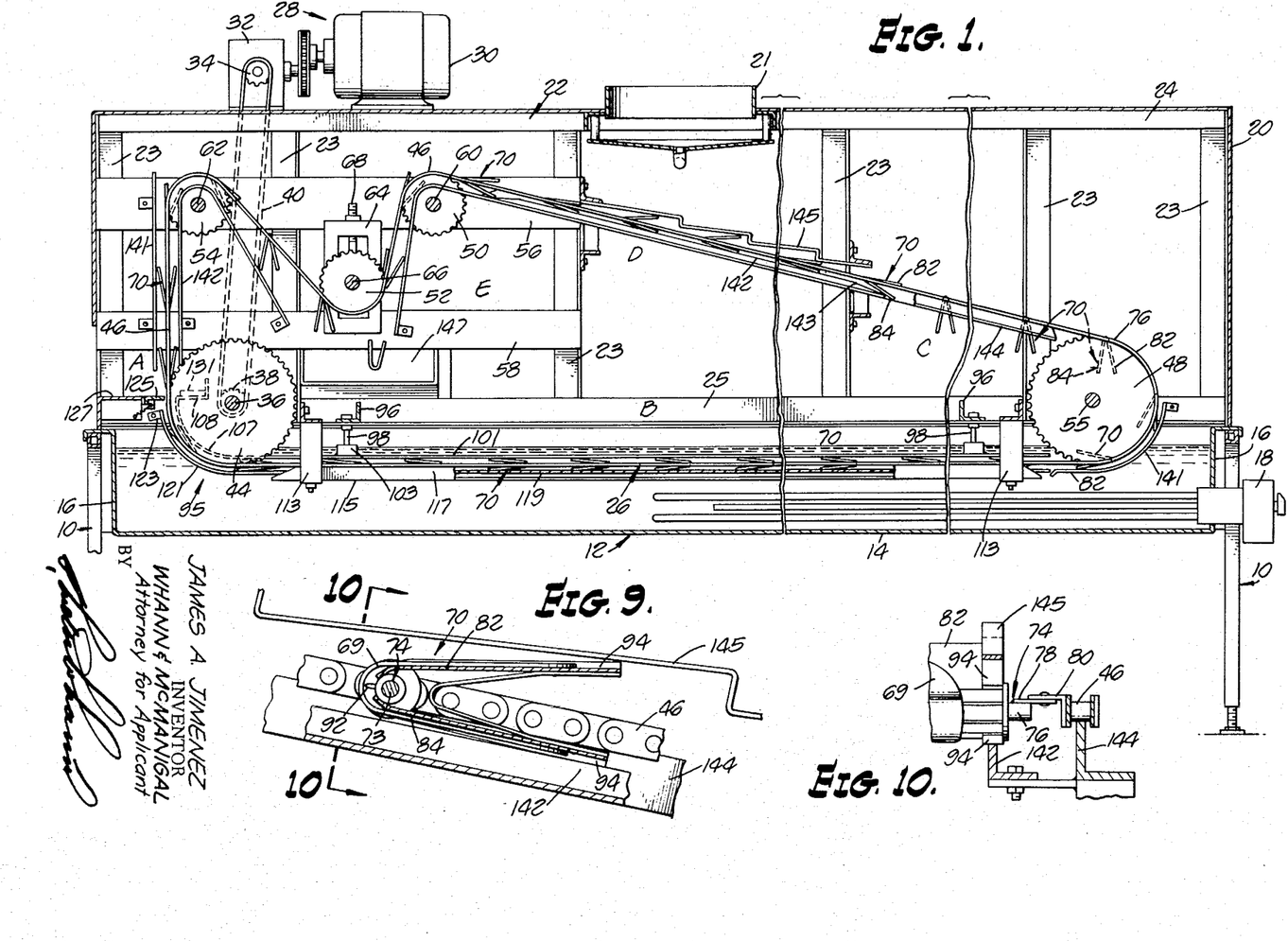
FIG. 1 is a side view of the apparatus for preparing taco shells shown partly in cross section to illustrate the arrangement of the various elements which cooperate in the preparation process.
FIG. 9 is a fragmentary view of an upper rearward portion of the apparatus illustrating the operation of the taco shell separation means which frees the cooked taco shell from the forming means.
FIG. 10 is a fragmentary view taken along 10—10 of FIG. 9 showing the way in which the forming means is supported by the separation means.

Referring now to FIG. 1 of the drawings, a side view of the taco shell cooking apparatus shown partly in section illustrates the general arrangement of the various elements which cooperate in the preparation of taco shells or similar food products. The food preparation process, which the apparatus of this invention is adapted to perform, includes the tortilla pickup and forming cycle designated as A, the cooking cycle B, the draining cycle C, the separation cycle D, wherein the cooked and shaped tortilla is separated from the forming means, and finally the product ejection step E where the prepared taco shell is delivered from the apparatus for use in preparing tacos.

In FIG. 1, numeral 10 designates a supporting means for supporting an elongated cooking vessel 12 having a bottom 14, spaced sides 15 and ends 16. Cooking vessel 12, wherein the cooking cycle takes place, is adapted to contain cooking oil suitable for cooking food products such as tortillas and the like. An oil heating means as, for example, a thermostatic controlled immersion heater 18 for heating the cooking oil to a desired temperature, is placed adjacent to and in operable association with cooking vessel 12. To contain fumes emanating from the oil during the cooking cycle, a hood 20 is placed over cooking vessel 12, and a venting means 21 is provided near the top of hood 20 for venting fumes to the atmosphere and for collecting and carrying away water which may condense near the vent area. A superstructure 22, carried by supporting means 10, supports hood 20 and is comprised of a plurality of spaced vertical members 23 and spaced upper and lower generally horizontal rails 24 and 25.

Figure 3:
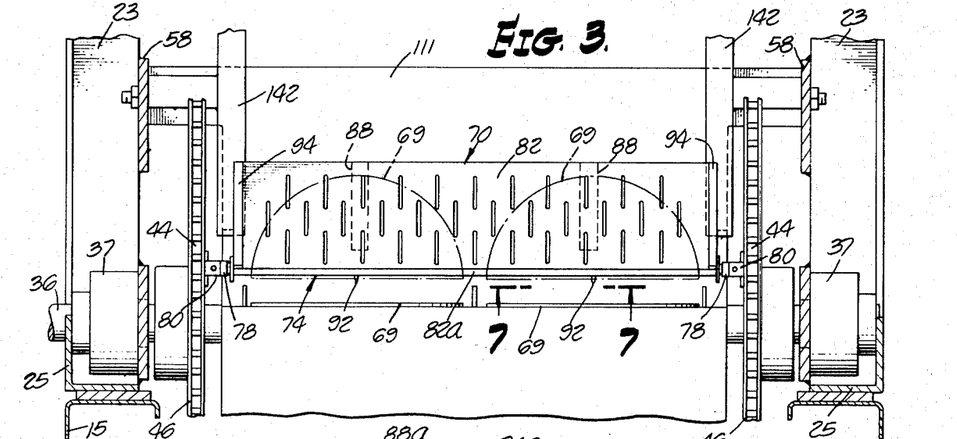
FIG. 3 is a fragmentary section view taken along 3—3 of FIG. 2 showing a taco shell forming means adapted to carry two tortillas.

A conveyor means 26 for moving food products such as tortillas through the preparation process is housed within the enclosure formed by cooking vessel 12 and hood 20. Conveyor means 26 is driven by a driving means 28 which is mounted on hood 20 and which comprises a motor 30 and a reducer means 32 having a chain drive sprocket 34. Referring to FIG. 3, it can be seen that conveyor means 26 includes a transverse shaft 36 journaled in a pair of spaced bearings 37 which are supported by lower rails 25 of superstructure 22. As shown in FIG. 1, a sprocket 38 is affixed to shaft 36 at one of its extremities and is operatively coupled with drive sprocket 34 by means of drive chain 40 so that shaft 36 can be rotated in a counterclockwise direction by operation of driving means 28.

As can most clearly be seen in FIG. 3, a pair of laterally spaced right and left conveyor driving sprockets, each designated as 44, is affixed to shaft 36 near its outer extremities for rotation in spaced vertical planes. Passing under and meshing with each driving sprocket 44 is an endless conveyor chain 46. As seen in FIG. 1 (one chain only being shown), conveyor chains 46 travel through cooking vessel 12, are strung under spaced right and left idler sprockets 48, and then travel upwardly and forwardly passing around pairs of spaced right and left idler sprockets 50, 52 and 54. Since each conveyor chain 46 must travel in a generally vertical plane defined by the plane of rotation of sprockets 44, each left and right idler sprocket is spaced so as to be co-planar with the respective planes of rotation of right and left drive sprockets 44. Idler sprockets 48 (the right one only being shown in FIG. 1) are affixed to a shaft 55 which is rotatably mounted in bearings (not shown) supported by horizontal rails 25. Affixed to members 23 located near the forward end of the apparatus is an upper and lower pair of spaced generally horizontally disposed members 56 and 58. Upper members 56 are adapted to support pairs of bearings (not shown) in which the co-planar shafts 60 and 62 are free to rotate. Mounted near the extremities of shafts 60 and 62 are pairs of idler sprockets 50 and 54 (one only of each pair being shown). Lower members 58 support a bracket 64 in a position intermediate of and below pairs of idler sprockets 50 and 54. Bracket 64 is adapted to adjustably support bearings (not shown) in which a shaft 66 is free to rotate, and has adjusting means 68 adapted to cooperate with the bearings of shaft 66 to allow vertical adjustment of its axis of rotation. A pair of idler sprockets 52 (one only being shown) is attached to shaft 66 near its ends. Through adjustment of adjusting means 68, sprockets 52 may be moved up or down, thereby providing a means for adjusting the tension on conveyor chains 46 which are strung thereunder.

Figure 2:
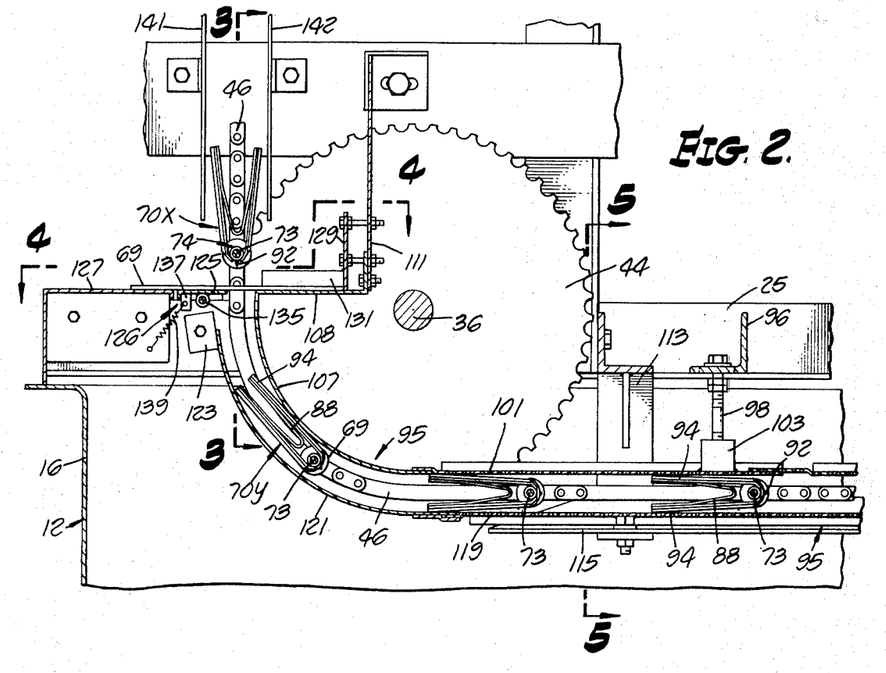
FIG. 2 is an enlarged fragmentary view of the forward portion of the apparatus shown in FIG. 1, illustrating the method of introduction of tortillas into the cooking cycle.

Referring now to FIGS. 2 and 3, taco shell forming means adapted to hold and suitably shape tortillas 69 during the preparation process are designated by numeral 70. Numerous taco shell forming means 70 are affixed to conveyor chains 46 at spaced points typically designated by numerals 73.

Each taco shell forming means 70 includes a carrier means 74, which comprises an elongated carrying pin 76 having tabs 78 at its extremities. Tabs 78 are affixed to conveyor chain tabs 80 which periodically protrude from and are affixed to opposing links of conveyor chains 46. As shown in FIG. 1, the taco shell forming means 70 may thusly be made to move through the cooking apparatus as chains 46 are driven by driving means 28.

Figures 6, 7, 8:
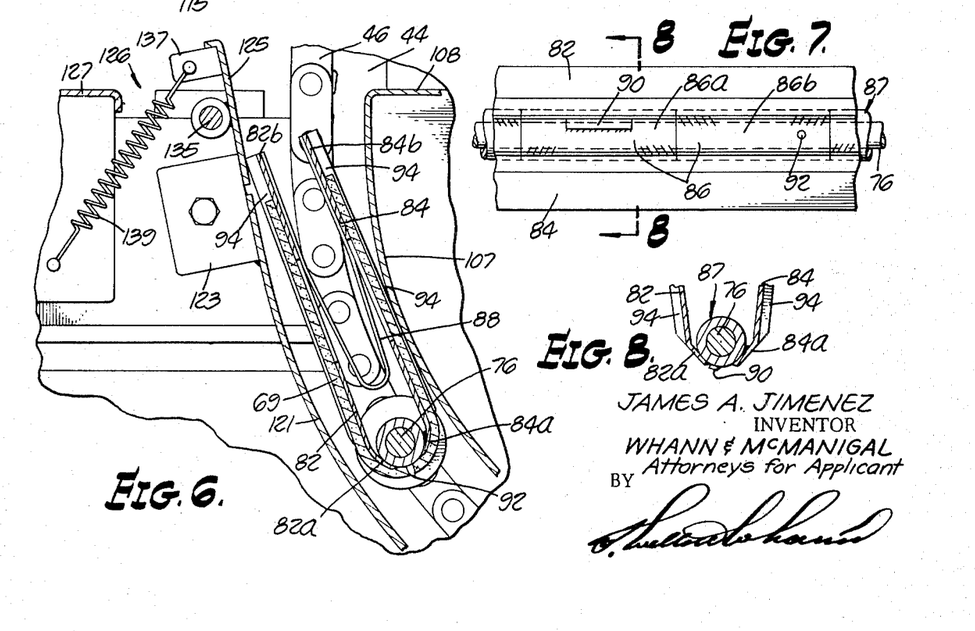
FIG. 6 is an enlarged fragmentary view of the inlet portion of the apparatus showing a forming means entering into the guide means and moving downwardly into the cooking vessel.
FIG. 7 is a fragmentary view taken along 7—7 of FIG. 3 showing the construction of a stop means on the taco shell forming means for controlling the width of the forming means.
FIG. 8 is a fragmentary cross sectional view taken along 8—8 of FIG. 7 further illustrating the construction of the stop means.

Of critical importance to the successful operation of the taco shell cooking apparatus is the novel design of taco shell forming means 70, the detailed construction of which is illustrated in FIGS. 3, 6, 7 and 8. Referring particularly to FIGS. 6 and 7, taco shell forming means 70 can be seen to comprise, in addition to carrier means 74, wing-like perforated side panels 82 and 84 affixed at their leading edges 82a and 84a to segments 86 of an elongated cylindrical-shaped segmented hinge-like body 87 having a central bore through which is passed carrying pin 76 of carrier means 74. A biasing means such, for example, as leaf spring 88, interconnects side panels 82 and 84 at their inner surfaces and is adapted to urge relative separation of side panel trailing edges 82b and 84b. It is to be observed that side panels 82 and 84 may rotate as a unit about the axis of carrying pin 76. Similarly, individual side panels 82 and 84 may swing or expandably move relative to each other about the same axis of rotation against the urging of biasing means 88.

Referring now to FIGS. 7 and 8 where further details of the construction of forming means 70 are shown, a stop block 90 can be seen affixed to a segment 86a of hinge body 87. This stop block 90 limits the arc through which side panels 82 and 84 may swing relative to each other due to the urging of leaf spring 88. As can be seen in FIG. 8, by affixing side panel 82 to a hinge segment 86b it is free to rotate relative to the hinge segment 86a upon which stop block 90 is affixed. The rotation of side panel 82 relative to side panel 84 is limited in movement to the point where its leading edge 82a engages stop block 90. Correct positioning of stop block 90 is most important for, as will be obvious from the discussion which follows, this position controls the volume of the cavity of the prepared taco shell in which a filler food product is placed in preparation of the taco.

Another novel feature of forming means 70 is the tortilla retainer means shown as pins 92 located on the leading edges thereof. As will presently be discussed in greater detail, retainer pins 92 are adapted to pierce the uncooked tortillas at their center point during the food pickup step, and to hold them proximate with the taco shell forming means 70 during the cooking and draining cycles.

Still another novel and very important feature of the forming means 70 is the positioning of bearing means 94 near the outer edges of side panels 82 and 84. Bearing means 94 serves the important function of carrying all pressural loads which are exerted on forming means 70 during the preparation process, thereby protecting the tortillas from directly experiencing any such loads. It is to be observed that this construction protects the tortilla from pressural loads without clamping it in a way which inhibits the flow of cooking oil about its outer surfaces.

Figure 11:
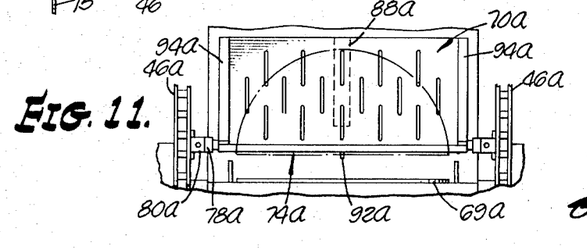
FIG. 11 is a fragmentary view similar to FIG. 3 illustrating an alternate embodiment of a forming means adapted to carry a single tortilla.

As illustrated in FIG. 3, forming means 70 may be wide enough to accommodate two tortillas, thereby allowing simultaneous processing of two tortillas per taco shell forming means 70 or, as shown in FIG. 11, may be of a width to accommodate only one tortilla. In FIG. 11, the various components of the apparatus, including the forming means designated as 70a, are designated by previously used identifying numerals followed by the subscript a. It is to be observed that the width of the various components of the taco shell cooking apparatus and the spacing between driver sprockets, idler sprockets, and conveyor chains vary, depending upon which taco shell forming means is to be used.

Figure 5:
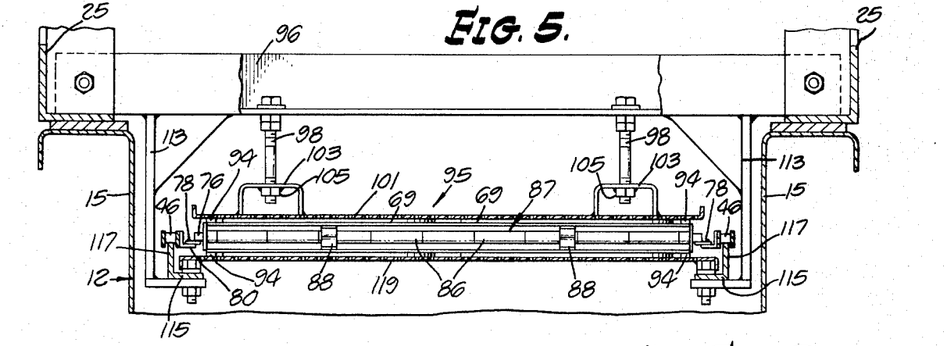
FIG. 5 is a fragmentary section view taken along 5—5 of FIG. 2 looking into the cooking vessel and showing a portion of one alternate embodiment of a guide means for guiding the forming means through the cooking cycle.

FIG. 5, which is a view looking directly into the forward end of cooking vessel 12, illustrates one embodiment of a guide means or confining means in the form of a pair of wall means which is generally designated as 95. Confining means 95 serves to guide the taco shell forming means through the cooking cycle. The structure which positions guide means 95 within cooking vessel 12 includes a pair of cross members 96 (one only being shown) extending transversely of rails 23. Depending from cross members 96 is a plurality of threaded studs 98 adapted to support an elongated substantially horizontally disposed upper guide or confining member 101. Mounting brackets 103, to which studs 98 are attached by nuts 105, are provided on the upper surface of guide member 101. Studs 98 are of such a length that guide member 101 may be adjustably disposed in a plane which is intermediate of cooking vessel 12, and is somewhat above the plane generated by pairs of conveyor chains 46 as they pass under pairs of sprockets 44 and 38. Upper guide member 101 which forms a guide wall through cooking vessel 12 has numerous perforations to allow free circulation of the cooking oil and is of a width somewhat less than the lateral spacing between conveyor drive sprockets 44 and idler sprockets 48. Referring to FIG. 2, it can be seen that telescopically attached at the forward end of guide member 101 is an upwardly curved guide or confining member section 107 having a radius of curvature slightly less than the radius of drive sprockets 44. The upper end of curved guide member section 107 extends to a point slightly above the axis of rotation of driving sprockets 44, where it sharply doglegs to the right generating a horizontally disposed surface 108, and is then secured to a vertically disposed back plate 111 which, in turn, is affixed to superstructure 22.

Referring again to FIG. 5, shown depending from cross members 96 are supporting members 113 adapted to carry a pair of laterally spaced horizontally disposed rails 115. Rails 115 have flanges 117, the upper surfaces of which are located in a plane slightly below the plane of guide or confining member 101. The purpose of flanges 117 is to provide support to conveyor chains 46 as they travel through cooking vessel 12. Affixed to supporting members 113 is a horizontally disposed elongated lower guide or confining member 119 which is perforated and is of the same width as upper guide or confining member 101. As shown in FIG. 1, lower guide member 119 forms a lower guide wall which is held in a parallel relationship with upper guide member 101 throughout its length and is spaced therefrom by an amount somewhat less than the maximum width of taco shell forming means 70. As shown in FIG. 2, telescopically attached at the forward end of guide or confining member 119 is a lower curved guide member section 121 disposed in spaced relationship with curved guide member section 107. Guide member section 121 terminates at a point slightly below the axis of rotation of driving sprockets 44 and is secured to a bracket 123. Bracket 123 is in slidable engagement with superstructure 22 and is adapted for longitudinal adjustment whereby guide member section 121 may be telescoped forwardly relative to lower guide member 119. This allows the spacing between the curved guide member sections to be varied as required to optimally accommodate the passage of forming means 70.

Figure 4:
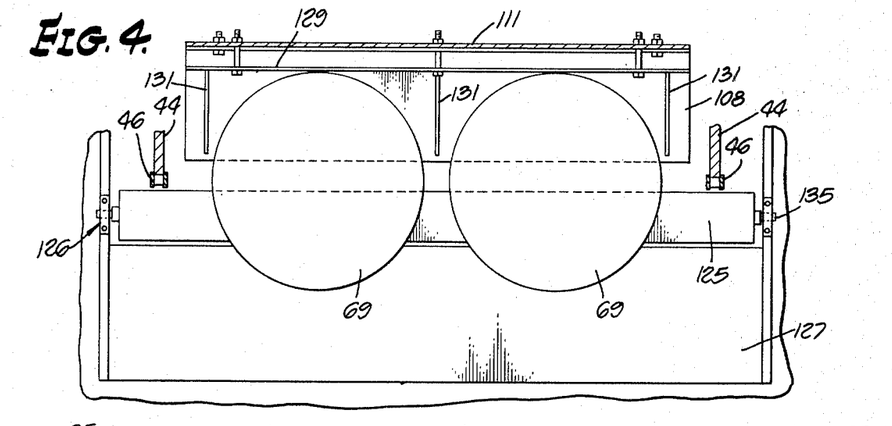
FIG. 4 is a plan view of the forward portion of the apparatus taken along 4—4 of FIG. 2 showing two tortillas in a position to be picked up by the forming means.

Referring now to FIG. 4 which is a plan view of the food pickup area, a horizontal surface 108 is shown partially supporting a pair of uncooked tortillas 69. Providing support to the remaining portions of tortillas 69 is an elongated hinged door 125 of gate means 126, and a horizontal work surface 127 which is supported by superstructure 22. Tortillas 69 are centered longitudinally of the pickup area by positioning them to contact a vertically disposed locating plate 129, which is adjustably affixed to generally vertical back plate 111. Tortillas 69 are centered transversely by locating them between dividers 131 which are affixed to locating plate 129 and extend at right angles therefrom. It is to be observed that when tortillas 69 are thusly positioned they will be pierced at their center points by retainer pins 92 of taco shell forming means 70 when, as will presently be described, conveyor means 26 carries taco shell forming means 70 to the tortilla pickup position.

Turning now to FIGS. 2 and 6, the food pickup step is illustrated and the component parts of gate means 126 are more clearly shown. Hinged door 125 is pivotally attached at its transversely disposed center line to a shaft 135 which is supported at its extremities by superstructure 22. A pair of spring brackets 137 (one only being shown) is affixed on the under side of hinged door 125 adjacent its lateral edges. Adapted to resist pivotal movement of hinged door 125 out of its normal horizontal position is a pair of coiled springs 139 which are affixed at one extremity to brackets 137 and at the other extremity to superstructure 22. The function and operation of gate means 126 may be illustrated by now describing the food pickup step.

Referring for the moment to the location designated by the letter A in FIG. 1, the conveyor chain 46 carrying forming means 70 can be seen to pass over pairs of idler sprockets 54 and then travel downward into cooking vessel 12 and around conveyor driving sprockets 44. As shown, conveyor chains 46 in this portion of the process pass between spaced vertical guide strips 141 and 142 which are affixed to horizontal members 56 and 58. Guide strips 141 and 142 are adapted to vertically orient the forming means 70 into a position illustrated in FIG. 2 by the forming means designated as 70x. In this position side panels 82 and 84 extend outwardly and upwardly and the tortilla retainer pins 92 extend downwardly. When a forming means 70 thus oriented reaches a position immediately above the tortillas 69 resting partially on hinged door 125, further downward movement by conveyor means 26 causes tortilla retainer pins 92 to pierce the tortillas 69 at their center points and causes a downward force to be exerted on the inside transverse edge of hinged door 125. As the forming means 70 continues to be moved by conveyor means 26 to a position shown in FIG. 6, hinged door 125 is caused to pivot about shaft 135 against the urging of springs 139 to a point where its right edge contacts bracket 123. It is to be observed that pressural forces exerted on forming means 70 as a result of contact with hinged door 125 are carried by bearing means 94 located on the edges of side panels 82. As can be seen in FIG. 6, when a forming means 70 reaches the position shown, it has entered the space between curved guide member sections 107 and 121, and bearing means 94 located on panel 84 of forming means 70 is in pressural contact with upper curved guide member section 107. Since the space between guide member sections 107 and 121 is less than the width of forming means 70 in its relaxed state, the trailing edges of side panels 82 and 84 are urged toward one another by pressural forces carried by bearing means 94. It can be seen that the movement of the forming means 70 through the gate means 126 and through the space between curved guide members 107 and 121 causes the tortillas 69 to tend to form about forming means 70. It is very important to note, however, that in the position of forming means 70, as illustrated by FIG. 6, tortillas 69 are protected from any pressural loads by bearing means 94 and, further, are free to engage either the side panels 82 and 84 of forming means 70 or the walls of curved guide member sections 107 and 121. This novel and important feature of forming means 70 prevents the tortillas 69 from being torn or otherwise damaged during the pickup step.

Referring again to FIG. 2, when the forming means 70 reaches a position shown by the assembly designated as 70y, hinged door 125 has returned to a horizontal position due to the urging of springs 139 and the forming means 70y carrying the formed uncooked tortillas 69 starts into the cooking cycle. As conveyor chains 46 move under driving sprockets 44, forming means 70y carrying the uncooked tortillas 69 will continue to move through the space between curved guide member sections 107 and 121, will be submerged in the heated cooking oil, and will enter the space between upper and lower guide members 101 and 119. During the passage of the forming means 70 through the length of cooking vessel 12, the tortillas 69 will be cooked by the heated cooking oil which, due to the novel design of forming means 70, is free to circulate around the tortillas. It is to be observed that the speed at which conveyor means 26 carries the forming means 70 through the cooking cycle must be carefully regulated to insure proper cooking of the tortillas 69 to a light flaky consistency. It should be further observed that as the forming means 70 passes between guide members 101 and 119, all pressural loads exerted by springs 88 of the forming means 70 tending to force side panels 82 and 84 against the guide members are borne by bearing means 94. If these loads are carried rather by the tortillas 69, experience as shown that tearing or other damage to the tortillas results and possible jamming of the apparatus can occur. The novel design of the forming means 70 of the present invention, however, prevents this, and the tortillas 69 are free to relaxably engage either the surfaces of the side panels 82 and 84 or the inner surfaces of the guide members 101 and 119. This design also allows free flow of the cooking oil over the surfaces of the tortillas.

Turning again to FIG. 1, it can be seen that as forming means 70 is carried by conveyor means 26 through guide means 95 and upwardly out of cooking vessel 12, the bearing means on the lower side panels 82 engages a pair of upwardly curved guide strips 141 (one only being shown) rigidly affixed to superstructure 22. Guide strips 141 support the forming means 70 as they pivot about the axis of carrying pins 76 to a position where side panels 82 and 84 depend downwardly.

As the assemblies continue to move upwardly and forwardly of the apparatus, they pass through the oil draining cycle C and enter into the separation cycle D. As can be seen in the upper portion of FIG. 1, a pair of narrow guide strips 142 (one only being shown) is affixed to superstructure 22. Guide strips 142 have a tapered flanged portion 143 on their upper edge which is adapted to engage bearing means 94 on the lower side panel 84 of forming means 70, causing rotation of the forming means 70 about the axis of carrying pins 76 to a more nearly horizontal but somewhat upwardly inclined position. Guide strips 142 extend upwardly and forwardly following the plane of conveyor chains 46 to a position where conveyor chains 46 pass downwardly. At this point they are attached to horizontal rails 58 of superstructure 22. Paralleling guide strips 142 is a pair of conveyor chain support members 144 adapted to support conveyor chains 46 as they move forwardly of the apparatus. As forming means 70 is carried by conveyor chains 46 toward the forward end of the apparatus, bearing means 94 on the upper side panel 82 of forming means 70 engages a pair of narrow stepped strips 145 which are attached to superstructure 22 in a spaced parallel relationship with guide strips 142. As can be more clearly seen in FIGS. 9 and 10, as forming means 70 is moved forwardly by conveyor chains 46 which are supported by members 144, side panels 82 and 84 of forming means 70 tend to be forced toward one another against the urging of leaf springs 88. Due to the stepped configuration of strips 145, leaf springs 88 of forming means 70 are caused to be alternately compressed and then abruptly relaxed, causing the now cooked taco shell to vibrate forward of the forming means 70, as is shown in FIG. 9. This movement frees the taco shells from retainer pins 92. Referring to FIG. 1-E, as the conveyor chains 46 move around idler sprocket 50, placing the taco shell forming means 70 in a downwardly depending position, the taco shell is free to slide from the forming means 70, fall into schute 147, and be delivered from the apparatus for use.

Figure 12:
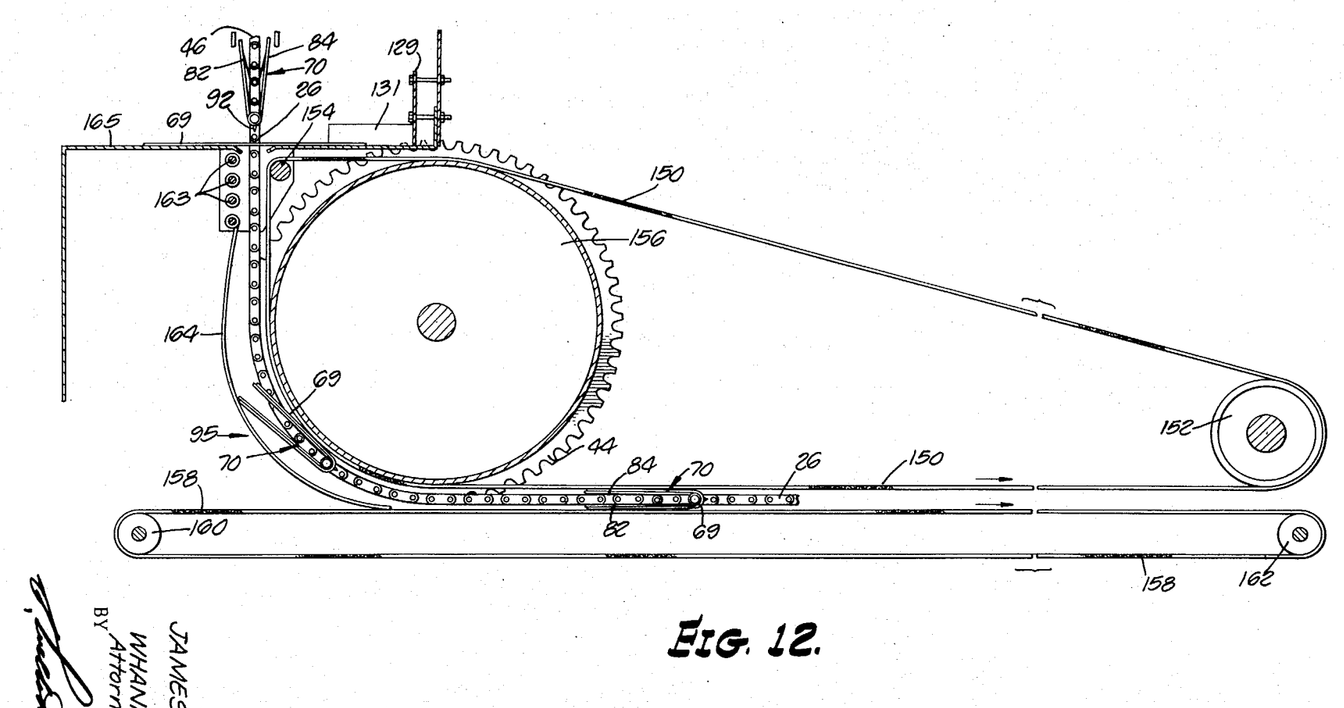
FIG. 12 is a side view of a first alternate embodiment of a guide means for guiding the forming means through the cooking cycle.

Referring now to FIG. 12, a first alternate embodiment of guide means 95 is illustrated, like numerals being used to identify like elements as previously described. Numeral 150 designates a first endless wire mesh belt which is driven in a counterclockwise direction by a drive roll means 152 and comprises a part of the guide or confining means of this form of my invention. Belt 150 passes around an idler roll 154 which is rotatably mounted on superstructure 22 and then travels around a drum 156 which is positioned between and cooperates with idler sprockets 48 of conveyor means 26. Drive roll 152, idler roll 154 and drum 156 are positioned relative to one another so that belt 150 will follow a path which allows frictional engagement thereof with forming means 70 as said forming means are carried by conveyor means 26 downwardly into and then horizontally through cooking vessel 12.

A second endless wire mesh belt 158 which forms another part of the guide or confining means of this form of my invention is driven in a clockwise direction around idler roll 160 by drive roll means 162. Belt 158 is driven at the same speed as belt 150 and conveyor chains 46 and follows a path which includes a plane lying in a spaced parallel relationship with plane generated by belt 150 as it passes through cooking vessel 12. As illustrated by FIG. 12, the generally horizontal passageway formed between belts 150 and 158 is of such a width that side panels 82 and 84 of forming means 70 are frictionally engaged by said belts. Since belts 150 and 158 are moving at the same speed as conveyor chains 46, the tortilla carrying forming means 70 will be supported by said belts during travel through the cooking cycle with no relative movement being experienced between the forming means and wire mesh belts. In this way, dragging forces between the forming means 70 and the belts 150 and 158 which could tend to damage the tortilla are eliminated.

To expedite the smooth entrance of the tortilla carrying forming means 70 into the cooking vessel, a plurality of guide rollers 163 is rotatably mounted on superstructure 22 transversely of cooking vessel 12 and in a spaced parallel relation with belt 150 as it travels vertically downward into cooking vessel 12. A plurality of curved guide members 164 is positioned between guide rollers 163 and belt 158 to provide additional support and guidance to forming means 70 as said forming means moves downwardly into cooking vessel 12.

In this embodiment gate means 126 has been eliminated and the taco shell forming means 70, during the pickup cycle, are adapted to pass through a flanged lateral opening formed in tortilla pickup table 165.

Figure 13:
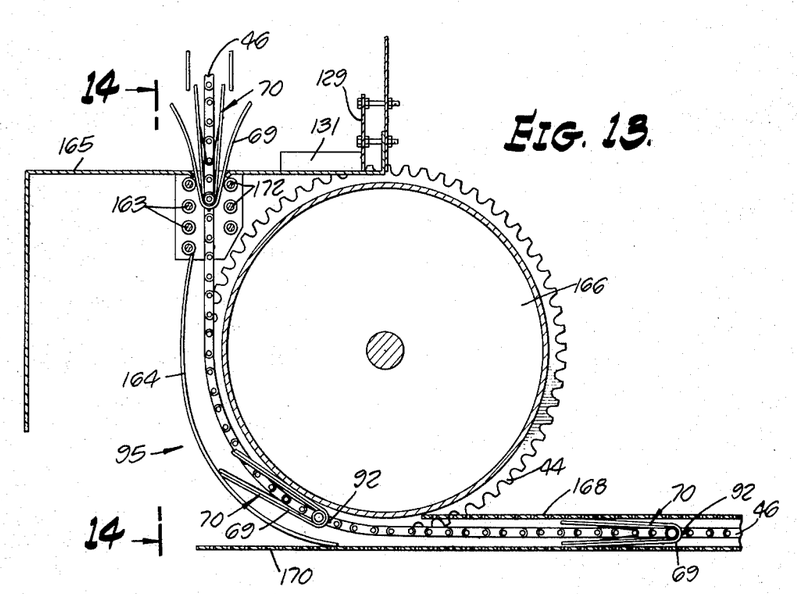
FIG. 13 is a side view of a second alternate embodiment of a guide means for guiding the forming means through the cooking cycle.
Figure 14:
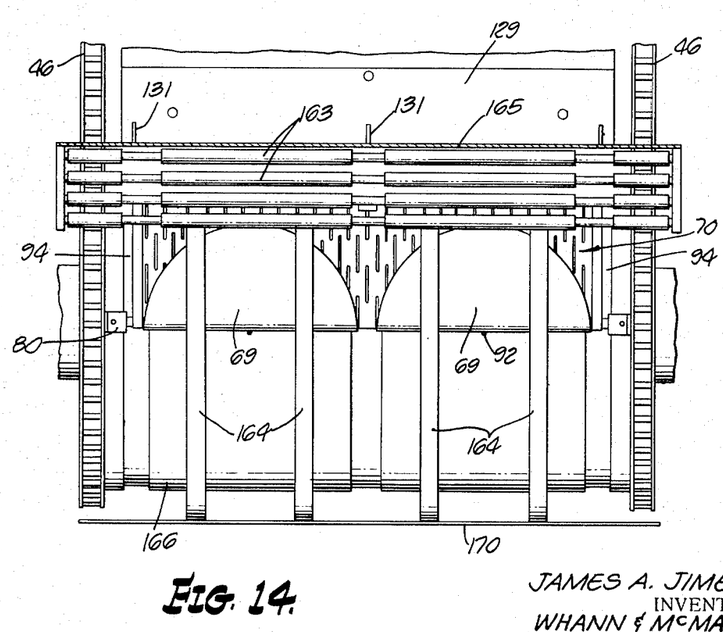
FIG. 14 is a view of the second alternate embodiment of the guide means taken along 14—14 of FIG. 13.

FIGS. 13 and 14 show a second alternate embodiment of guide means 95, like numerals being used to identify like elements as previously described. In FIG. 13 numeral 166 designates a guide drum means positioned between and cooperating with idler sprockets 44 of conveyor means 26. Disposed within cooking vessel 12 is an elongated guide member 168 located in a generally horizontal plane tangential with guide drum means 166. Located in a spaced parallel relationship with guide member 168 is an elongated guide member 170. Elements 166, 168 and 170 thusly described comprise certain of the elements of this form of the guide means or confining means of my invention.

As can more clearly be seen in FIG. 14, guide rollers 163 are, in the same manner as in the first embodiment of guide means 95, rotatably mounted on superstructure 22 transversely of cooking vessel 12. Guide rollers 163 are spaced from guide drum means 166 and are frictionally engageable by forming means 70 moving downward through the tortilla pickup cycle. A plurality of curved guide members 164, here shown as curved bars, is disposed in a spaced relationship with guide drum means 166. As shown in FIG. 13, guide members 164 are mounted between guide rollers 163 and guide member 170 and serve to guide forming means 70 into the passageway formed between guide members 168 and 170. To further facilitate forming means 70 through the tortilla pickup cycle, a plurality of guide rollers 172 is affixed to superstructure 22 in a spaced parallel relationship with guide rollers 163.

In operation, since guide drum means 166 of this embodiment is moving at the same speed as conveyor chains 46, forming means 70 are carried smoothly into the cooking cycle. There being no relative movement between drum means 166 and forming means 70, drag forces which could tend to damage the tortilla are, of course, eliminated.

While specific embodiments of the invention have been shown and described, the invention is not limited to the particular construction disclosed. Accordingly, it is intended that all modifications which fall within the true scope of the invention be included in the appended claims.

I claim:

1. An apparatus for preparing taco shells comprising:
   a. a cooking vessel,
   b. confining means defining a passageway through said cooking vessel,
   c. forming means having at least one yieldable side panel adapted for expansive movement within said confining means, said forming means being generally V-shaped in cross section in both a confined and relaxed state,
   d. means for moving said forming means through the passageway defined by said confining means including means for elevating said forming means above said cooking vessel, and
   e. means for positioning tortillas in the path of said forming means prior to the movement of said forming means into said confining means.

2. An apparatus for preparing taco shells and the like comprising:
   a. a cooking vessel,
   b. a taco shell forming means having at least one yieldable side panel for forming a tortilla to which a tortilla may be applied,
   c. guide means comprising a plurality of spaced guide elements positioned within said cooking vessel between which said taco shell forming means is moved, said guide elements being movable along the path of movement of said taco shell forming means, and
   d. means for moving said taco shell forming means between said guide means.

3. The apparatus defined in claim 2 wherein the guide means comprises:
   a. a first endless belt,
   b. a second endless belt, and
   c. means for driving said first belt along a path which includes a first plane intermediate of said cooking vessel and means for driving said second belt along a path which includes a plane laying substantially in a spaced parallel relationship with said first plane.

4. An apparatus defined in claim 2 wherein said guide means comprises:
   a. a guide drum rotatably mounted within said cooking vessel,
   b. an elongated rigid first guide member mounted within said cooking vessel in a plane tangent to the outer surface of said guide drum,
   c. an elongated rigid second guide member mounted within said cooking vessel in a spaced parallel relationship with said first guide member, and
   d. a plurality of curved guide elements cooperating with said second guide member, said guide elements having a radius of curvature larger than that of said guide drum.

5. An apparatus for preparing taco shells comprising:
   a. a cooking vessel,
   b. confining means defining a passageway through said cooking vessel,
   c. forming means having at least one yieldable side panel adapted for expansive movement within said confining means,
   d. means for moving said forming means through the passageway defined by said confining means including means for elevating said forming means above said cooking vessel,
   e. means for positioning tortillas in the path of said forming means prior to the movement of said forming means into said guide means, and
   f. a taco shell separation means frictionally engageable by said forming means for urging relative movement between the cooked tortilla and said forming means.

6. The apparatus in accordance with claim 5 wherein said taco shell separation means comprises:
   a. a rigid guide element mounted above said cooking vessel, and
   b. a stepped guide element mounted in a spaced relation with said rigid guide element for permitting said forming means to expand in order to loosen said tacos from said forming means.

7. The apparatus in accordance with claim 5 wherein said means for positioning tortillas comprises:
   a. a tortilla supporting surface,
   b. a first locating means cooperating with said tortilla supporting surface for locating a tortilla relative to a first axis, and
   c. a second locating means cooperating with said tortilla supporting surface for locating a tortilla relative to a second axis.

8. An apparatus for preparing taco shells and the like comprising:
   a. a cooking vessel,
   b. a taco shell forming means having at least one yieldable side panel for forming a tortilla to which a tortilla may be applied, said taco shell forming means comprising:
      1. a carrier means,
      2. side panels in pivotal association with said carrier means and having leading and trailing edges, 3. bias means tending to urge separation of the trailing edges of said side panels, and
4. bearing members on said side panels adapted to carry pressural loads experienced by said side panels,
c. guide means comprising a plurality of spaced guide elements positioned within said cooking vessel between which said taco shell forming means is moved, and
d. means for moving said taco shell forming means between said guide means.

9. The apparatus defined in claim 8 wherein said side panels have tortilla retainer means affixed to the leading edges thereof.

10. The apparatus defined in claim 8 wherein the bias means tending to urge separation of the trailing edges of said side panels comprises a spring interconnecting said side panels.

11. The apparatus defined in claim 8 wherein the bearing members comprise bearing strips affixed near the longitudinal edges of said side panels.

12. The apparatus defined in claim 8 including means for limiting separation of the trailing edges of said side panels.

13. An apparatus for preparing taco shells and the like comprising:
a. a cooking vessel,
b. a generally V-shaped taco shell forming means having at least one yieldable side panel for forming a tortilla to which a tortilla may be applied,
c. guide means comprising movable spaced guide elements positioned within said cooking vessel and disposed in planes forming a space between which said taco shell forming means is moved, said guide means being adapted to confine the tortilla within the space between said guide elements and said taco shell forming means as the latter means is moved between said guide elements, and
d. means for moving said taco shell forming means between said guide means.

* * * * *